March 13, 1956  P. J. WALSH  2,738,458
ALTERNATING CURRENT REGULATING DEVICE
Filed May 20, 1952  5 Sheets-Sheet 1

INVENTOR
Philip J. Walsh
BY
Lippincott & Smith
ATTORNEYS

March 13, 1956  P. J. WALSH  2,738,458
ALTERNATING CURRENT REGULATING DEVICE
Filed May 20, 1952  5 Sheets-Sheet 4

INVENTOR
*Philip J. Walsh*
BY
*Lippincott + Smith*
ATTORNEYS

INVENTOR
Philip J. Walsh
BY Lippincott + Smith
ATTORNEYS

United States Patent Office 2,738,458
Patented Mar. 13, 1956

2,738,458

ALTERNATING CURRENT REGULATING DEVICE

Philip J. Walsh, San Francisco, Calif.

Application May 20, 1952, Serial No. 288,810

12 Claims. (Cl. 323—61)

This application relates to devices for regulating voltage, current, or both, in alternating current circuits. Essentially the device herein disclosed is a transformer, or at least, has certain characteristics of a transformer, and when provided with a suitably proportioned output circuit it will deliver to such circuit a voltage which remains contant within very narrow limits throughout a wide range of input voltages. The basic circuit has, however, the additional feature of a negative input impedance characteristic; i. e., the input current varies in inverse proportion to the applied input voltage. Therefore, when the input circuit is connected in series with a varying load, it may be used as a current regulator, maintaining a current through the load at a substantially constant value. These two aspects of the invention have been set forth in the prior applications of the same inventor, entitled, respectively, "Constant Voltage System," Serial No. 72,713 filed January 25, 1949, now abandoned, and "Negative Impedance," Serial No. 42,079 filed August 2, 1948, now abandoned, of both of which applications this is a continuation-in-part.

The invention has other useful properties aside from those described in the prior applications mentioned, as will be more fully set forth hereinafter.

Among the objects of this invention are to provide a voltage regulating transformer which will maintain a substantially constant output voltage over a wide range of input voltages and loads; to provide a transformer of the character described which will maintain substantially its designed maximum output current into loads of decreasing impedance without overloading the input circuit; to provide a regulating transformer which, upon full short circuit conditions in the output, will drop substantially the entire load, picking it up again when the short circuit is removed; to provide a device wherein the apparent alternating current impedance, as viewed from the input, varies, over a wide range, in greater than direct proportion to the applied voltage, i. e., wherein the input impedance characteristic is negative; to provide a device of the character described which may be designed to operate at the frequencies of normal commercial supplies or at any other frequencies up to the megacycle range; to provide a type of electromagnetic circuit having two definite stable states, either of which it may be made to assume at will by varying either the supply voltage, the load imposed upon the device or by introducing a pulse which effectively changes, instantaneously, either one of these factors; and to provide a device of the character described which is simple and economical in construction and which may readily be designed to fulfill substantially any desired condition of input to output voltage ratio, load capacity, or frequency of supply voltage.

Considered broadly the device of this invention comprises a ferromagnetic core providing a substantially complete magnetic circuit between its end portions and having a branch magnetic path bridging this magnetic circuit at a point between such end portions. The device is provided with a primary or input winding on one of the end portions and on the branch portion, and, in nearly all cases, with a winding on the other end portion. The additional coils are relatively so proportioned that of the voltages developed therein on open circuit, with no load imposed upon either of these two coils, that voltage developed in the coil on the central or branch path exceeds that developed in the winding on the end path. The two latter windings are connected to form a loop circuit wherein the open circuit voltages "buck" or are opposed, and in series with the two coils in the loop circuit there is introduced a condenser.

The simplest, and for substantially all purposes the best arrangement meeting the above recited requirements is a ferromagnetic core of the ordinary "window" type, having two end legs and an intermediate or center leg. A primary or input coil is wound on one of the end legs and the two additional windings are disposed, respectively, on the center and other end legs. The necessary criterion for operation in the manner to be described is that the open circuit voltage developed across the center leg be greater than that developed across the end leg when current flows in the primary winding, and that the connection in the loop circuit be so made that the open circuit voltages are in an opposed or bucking relationship.

When the loop circuit is closed and a voltage is applied across the primary winding, the potentials developed across the windings included in the loop circuit may assume either one of two completely different relationships, depending upon the value of the input voltage. Assuming an input of constant frequency, and an applied voltage of gradually increasing value, starting from substantially zero, as soon as the various voltages reach measurable values it will be found that that developed across the coil on the center leg is materially lower than that on the end leg, in spite of the fact that this is the reverse of the readings when the loop circuit is open. As the input voltage is increased the disparity between the voltages on the center and third legs becomes increasingly greater, that on the center leg remaining very low while that on the end leg rises at a relatively more rapid rate than the increase in input voltage. When the potential applied to the primary winding reaches some definite value, depending upon the design parameters of the device, a sudden change takes place; up to this critical point the voltages across the windings in the loop circuit have been opposed. When the critical value is reached the voltage across the winding on the end leg suddenly reverses in phase with respect to that on the center leg and in the primary winding. At the instant when this occurs the voltage across the coil on the center leg becomes the greater of the two. The relative magnitudes of the two voltages are dependent upon design factors which will be described hereinafter, but in a characteristic design the potential across the coil on the center leg will increase from a very few volts, perhaps five or ten, to a value of several hundred volts. The input potential at which this change occurs will be referred to hereinafter as the "jump point."

Further increase in input voltage results in substantially no change whatsoever in the voltage developed across the end leg coil of the loop circuit and in a change in potential across the coil on the center leg which is proportionately much smaller than the change across the primary coil. This state of affairs continues, with increased input voltage, until the input leg approaches saturation.

If, now, the input voltage be gradually decreased, the potential across the end coil will remain at its substantially constant level down to and beyond the point at which the jump occurred. Throughout the range in which it does remain constant the voltages across the loop circuit coils continue to boost instead of buck. With continued decrease in input voltage a point will finally be reached where the end leg coil voltage again suddenly reverses in phase and the first state is resumed, with currents and voltages at the values assumed at the same input potential when the voltage was being raised. The point at which this second change takes place will hereinafter be referred to as the "break point." The condition of the device when the loop circuit voltages buck will hereinafter be referred to as the "ordinary state" and that in which the voltages boost and potential across the end leg coil remains constant will be referred to as the "extraordinary state."

When the device is used as a transformer to supply a load at the constant voltage, this load is taken primarily from the end leg. Load circuits may be tapped in across the entire loop circuit coil on the end leg or it may tap only a portion of this coil, the voltage of the coil being divided as is the case in the ordinary auto transformer, or a separate winding may be provided on the end leg for supplying the load. Occasionally, for certain types of load, it is desirable to supply a minor portion thereof from the center leg but in the usual case it is preferred to use the end leg only.

Imposing a load upon the device will, in general, raise the voltages at which both jump and break occur. Thus in the test of one device it was found that under no load the jump occurred at approximately 80 volts, the input voltage could be raised to 130 volts before primary leg saturation effects were first noted, and the break point was somewhere between five and ten volts. Under full designed load the jump occurred at 100 volts, and the break point had been raised to 80 volts.

The input impedance of the device, whether unloaded or loaded, shows the negative characteristic throughout the extraordinary state up to the point where primary leg saturation effects become apparent. Once the extraordinary state has been established minimum input current is observed at maximum voltage and maximum input current at or just above the break point. If, starting at the jump point, the input voltage is increased and the input current measured, the latter will be found to decrease substantially linearly with linear increase in input voltage up to a certain definite value of the latter, where a minimum input current occurs. Further increase in input voltage results in a current rise, indicating an approach to saturation in the primary leg. Voltage regulation across the other, or output end leg, can be obtained for input voltages above this level but the negative impedance effect is no longer observable under such conditions.

All of the above will be more clearly understood and the various factors and phenomona leading to the effect will be described in connection with the accompanying drawings wherein.

Figure 15:
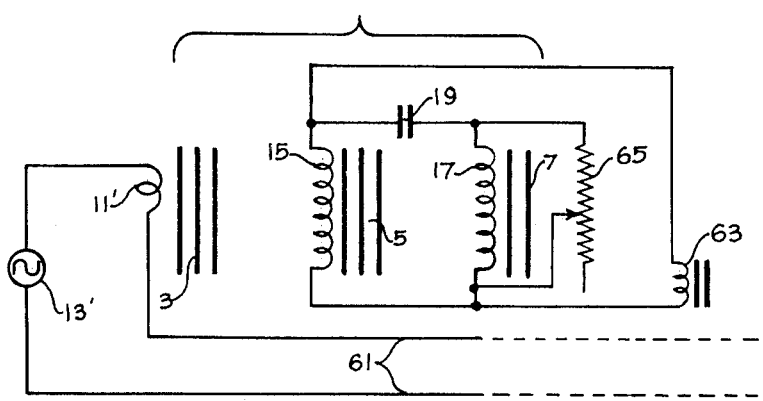
Figure 12:
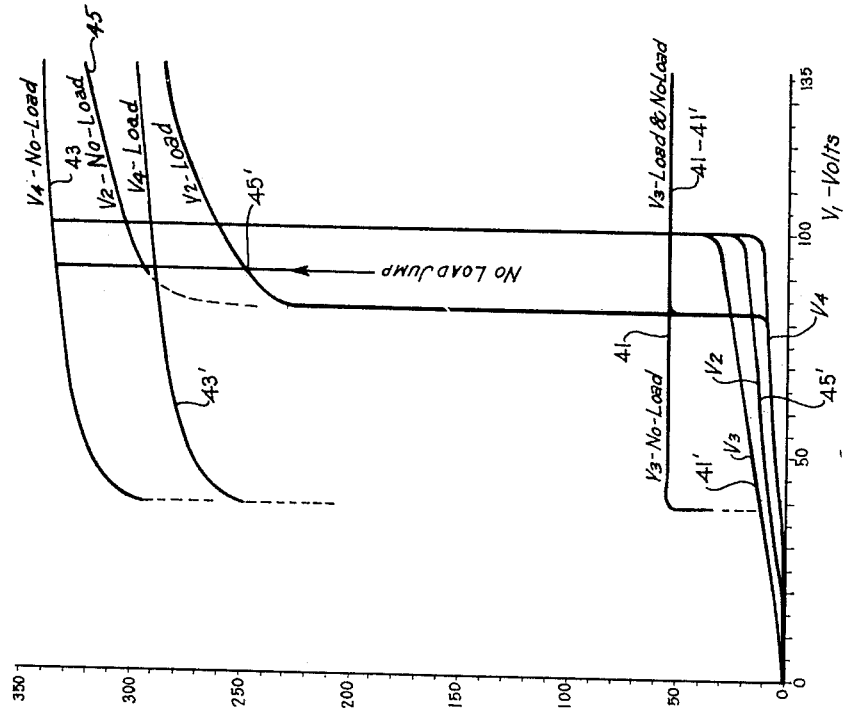
Figure 13:
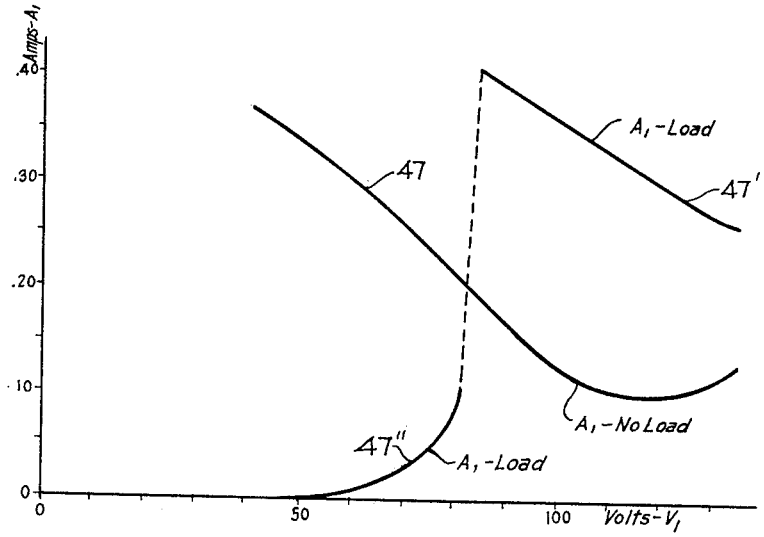
Figure 14:
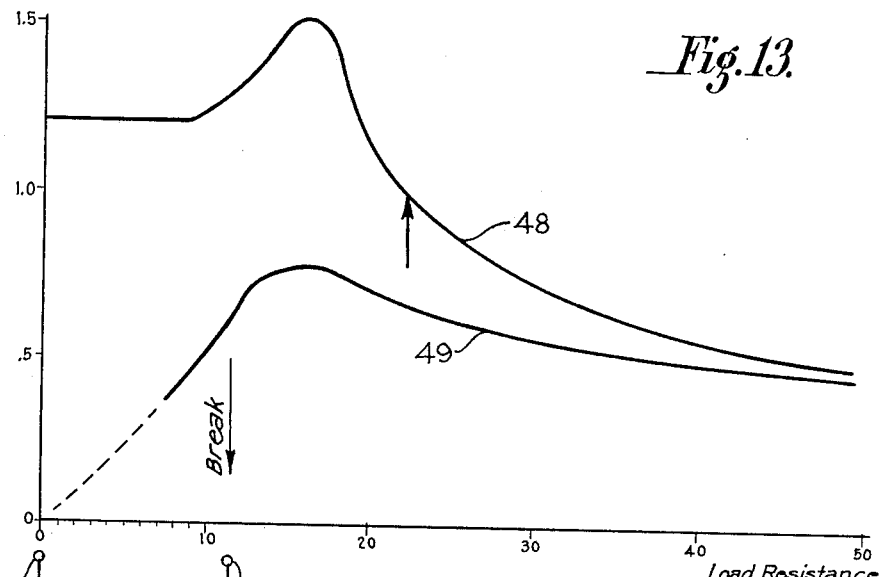
Figure 16:
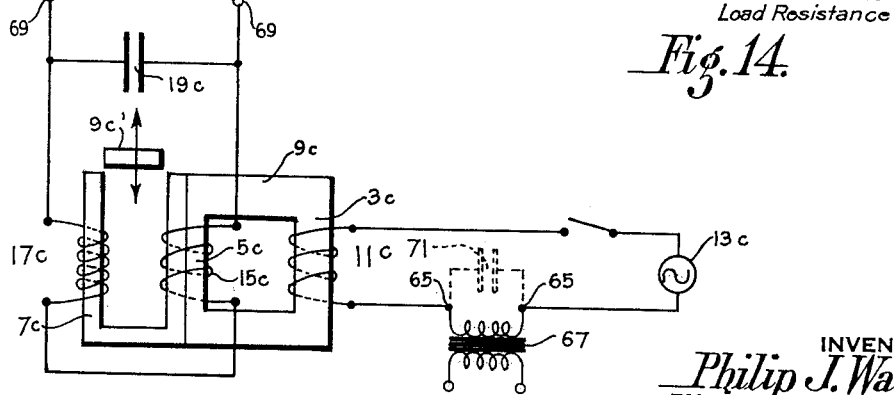

Fig. 12 comprises curves, similar to those of Fig. 11, in a later embodiment;

Fig. 13 is a curve showing the variation of input current and voltage of the same embodiment as that used in plotting the curves of Fig. 12;

Fig. 14 shows the variation of input and output currents with variation of load resistance for the same device;

Fig. 15 is a schematic diagram of a form of the device connected as an overload relay; and Fig. 16 is a schematic diagram of an embodiment of the invention employed as a negative impedance.

Figure 1:
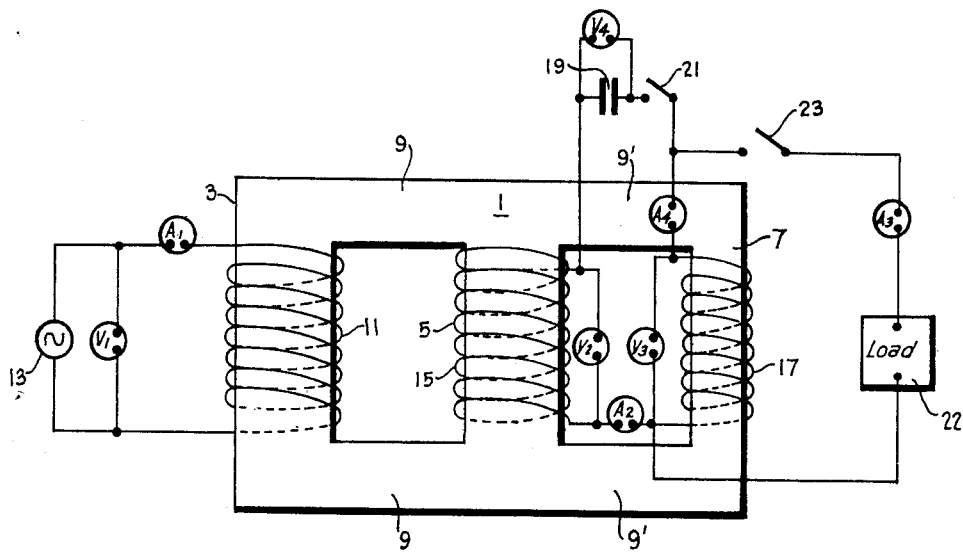
Fig. 1 is a schematic representation of the basic circuit of the device in its simplest form.

Considering first Fig. 1, the ferromagnetic core is generally indicated by the reference character 1. The core comprises three wound legs 3, 5 and 7 respectively, with yokes 9 joining input leg 3 with the center leg 5 and yokes 9' connecting the center leg with the other end leg 7. An input or primary coil 11 is wound on leg 3 and is supplied by a suitable source of alternating current 13. Coils 15 and 17 are on the center leg 5 and the other end leg 7 respectively.

It has been stated that the core 1 is ferromagnetic. It is to be understood that this term includes any material which exhibits permeabilities of a materially larger order of magnitude than unity over the initial portion of its magnetization curve, and, hence, exhibits saturation effects. The term therefore includes not only ferrous alloys such as silicon transformer steel and the alloys containing nickel and cobalt, such as the Permalloy group, but it also includes materials containing no iron at all, such as the Heusler alloys of copper, magnesium and aluminum, and the ferrites, which are oxides of bivalent metals or more particularly, mixtures thereof.

Preferably the core should be so designed as to make all of the magnetic paths therein substantially complete, i. e., the effective air gaps should be kept to as small a value as possible. It is well known that it is nearly impossible to build up a core of separate laminations, in such manner as to permit coils to be prewound and the cores inserted later, without introducing some effective air gap. This being the case it is quite clear that the introduction of an air gap into the system is not fatal to its operation and in some instances, as, for example, where the device is used for its negative impedance properties, it may even be desirable to introduce some slight gap in order to secure adjustability. In general, however, the smaller the air gap employed the better. The operation of the device depends upon the change in magnetic properties of the core material under different magnetomotive forces and the relatively very high reluctance of an air gap masks these effects. For this reason powdered metal cores, although usable, are not advantageous, and where the device is to be used upon frequencies in the higher ranges it is more desirable to use ferrite or cores comprised of very thin laminations of the Permalloy group of materials than it is to use powdered iron types.

The relative proportions of the various branches of the core are also subject to wide variation. The desired effects can be made to take place with all three of the wound legs and the connecting yokes having the same cross section. A more economical construction, as well as a more efficient one, is obtained when the legs 3 and 5 and the yokes 9 and 9' have about the same cross sectional area, while the cross section of leg 7 is approximately half that of the other members of the core. The reasons for these relative dimensions will become more apparent when the theory of operation is discussed below. Proportions are also somewhat dependent upon the particular properties of the magnetic materials used.

The specific apparatus here described for illustrative purposes employs high silicon content transformer sheets such as are obtainable on the open market from several manufacturers. The magnetic characteristics of such materials vary slightly, not only as between those furnished by different manufacturers but even from batch to batch as prepared by the same manufacturer.

Such design data as will be specifically set forth are derived from the published curves of the average values of sheets marketed as "U. S. S. Transformer 52, 29 gauge," as marketed by the Carnegie-Illinois Steel Corporation, and the ordinary 60 cycle, 115 volt supply is assumed. It is to be understood, however, that there is no restriction implied as to this specific material or even to this specific class of material, nor is there any restriction to frequencies of this order of magnitude. By proper choice of materials the invention can be employed at frequencies several orders of magnitude removed from that chosen for illustration and in almost any voltage range. For example, by employing ferrite cores operation at radio frequencies may be secured. By employing Permalloy or like cores the device may be employed at frequencies up to several hundred kilocycles. Known principles of transformer design are employed throughout, but it is, of course, necessary to choose materials suitable to the frequency range desired and to make the necessary computation with due regard to the magnetic properties of the materials chosen.

The primary coil 11 is designed for the desired voltage, frequency, and power ratings in accordance with the ordinary transformer formula;

$$E_{rms} = 4.44 B_{max} A N F \times 10^{-8}$$

Where $E_{rms}$ is the effective input voltage (assumed as sine wave form), $B_{max}$ is the maximum induction in the core in gausses, A the cross section in square centimeters N, the number of turns and F the frequency.

Manufacturers' curves for the core material here considered indicate a saturation value of approximately 19 kilogausses, maximum permeability at approximately 5 kilogausses and a normal working flux of from 10 to 12 kilogausses. Since the purposes of the device all involve a varying input voltage, the design is preferably based upon the maximum value of $E_{rms}$. The design of coil 11 depends to some extent upon whether it is to be used for its negative impedance characteristic or as a voltage regulator. The device will possess the negative impedance characteristic at values of magnetic induction somewhat higher than the normal working range—one particular device, using the transformer sheets mentioned, draws minimum current at a primary leg induction of approximately 14 kilogausses—but is still effective as a voltage regulator at primary leg inductions of 15 kilogausses or higher.

The criterion for coils 15 and 17 is, as has been stated, that the open circuit voltages, induced from the primary currents in coil 15, shall exceed those induced in coil 17. This will normally occur even though the wound legs 5 and 7 have the same cross section and the coils 15 and 17 have the same number of turns, since the additional reluctance of the magnetic circuit including yokes 9' and leg 7 will result in a lower flux flowing through these portions of the magnetic circuit than through the shorter path provided by leg 5. In the preferred form of core, wherein leg 7 is of smaller cross section this factor is, of course, accentuated very materially. Normally, however, the number of turns in the winding 15 will exceed those of the winding 17. In the limit the winding 17 may reduce to zero, but this would only be for special purposes, and the load-carrying capacity in this case becomes very small.

Coils 15 and 17 are connected in a loop circuit which includes a series condenser 19. For purposes of explanation a switch 21 is shown as included in this circuit, although usually such a switch would be omitted in a commercial device. The connection of the coils is such that on open circuit, i. e., with the switch 21 open, the voltages of the two coils are opposed, and any current which flows in the loop circuit when the switch is closed will be due to the differential voltage of the two coils.

Fig. 1 also indicates a load circuit connected across the terminals of coil 17. This circuit includes the load 22 and a control switch 23. Also shown in the diagram are voltmeters $V_1$ across the input leads to the device, $V_2$ across coil 5, $V_3$ across coil 17 and $V_4$ across the condenser 19. In addition there are shown ammeters $A_1$ in the input circuit, $A_2$ in the loop circuit, measuring the current from coil 15 to both coil 17 and the load, $A_3$ measuring current in loop circuit only and $A_4$ measuring the current in the coil 17. The various curves of voltage and current given in Figures 11 to 14 are designated by similar characters indicating the voltages and currents as indicated by these instruments.

Figure 2:
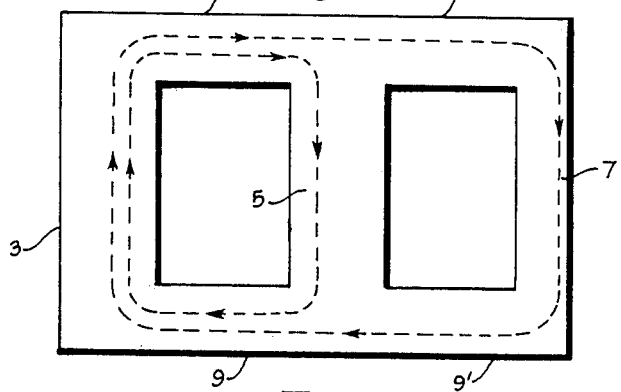
Fig. 2 is a diagram of the core only, showing the flux paths when the device is operating in the ordinary state.

If now switch 21 be closed, switch 23 remaining open, and a low voltage be applied from source 13 to coil 11 the resultant current in this coil will set up fluxes in the various portions of the circuit as indicated by the dotted lines in Fig. 2, the relative directions of these fluxes at any instant being indicated by the arrowheads on the lines. The greatest flux flows in leg 3. Where leg 5 bridges the magnetic circuit the flux divides, a part passing through leg 5 with a smaller portion passing through yokes 9' and leg 7. As a result of these fluxes voltages are induced in coils 15 and 17 and a current flows in the loop circuit including condenser 19. The direction of flow is determined by the higher voltage of coil 15.

Considered with respect to this coil only, the remainder of the loop circuit, comprising coil 17 and condenser 19, appears like a load circuit. The relative values of coil 17 and condenser 19 are such that at the designed frequency of operation the apparent inductive reactance of coil 17 exceeds, in absolute value, the apparent capacity reactance of condenser 19, and in this portion of the operating range the reactance of these two elements in series appears to be inductive. The total reactance of the circuit is, however, less than the reactance of coil 17 alone, since the voltage drop across condenser 19 is, insofar as the fundamental of the applied frequency is concerned, substantially 180° out of phase with that across the coil.

As a result of the loop circuit current a counter M. M. F. is developed in leg 5 and voltage $V_2$, across the terminals of this coil, drops below its open circuit value. At the same time this same current flowing in coil 17 acts to increase the flux in leg 7 with a resultant rise in the voltage $V_3$ across the terminals of coil 17. The potential drop across condenser 19 is, however, in the same direction as the voltage developed in coil 15, so that although voltage $V_2$ is less than voltage $V_3$ current continues to flow in the direction determined by voltage $V_2$.

Although a portion of the potential developed across coil 17 is due to flux induced in the coil by current in the primary coil 11 there is no method of direct measurement of the voltages induced whereby that due to this flux can be separated from that resulting from currents in the loop circuit. Flux from the primary merely adds to the apparent reactance viewed from coil 15.

As long as the voltage applied from the source 13 is low enough so that the flux in leg 7 is below the peak of the permeability curve, i. e., below about 5 kilogausses, increase of primary voltage results in an increase in the apparent reactance of coil 17 and of the loop circuit as a whole. Further increase, however, results in a decrease of apparent inductive reactance of the circuit. The term "apparent" is necessary in this context, since for most ferromagnetic materials and for all such materials at higher flux values the inductance changes constantly throughout each cycle of the exciting current and the reactance therefore changes as well. What is meant by "apparent reactance" is therefore the effective voltage divided by the effective current or $$\frac{E_{rms}}{I_{rms}}$$

The current in the loop circuit contains large harmonic components due to the changes of instantaneous values of inductance throughout the cycle, and these components become larger as the fluxes approach saturation value. In spite of these harmonic components, the major portion of the energy in the circuit is determined by the fundamental frequency of the supply. If the behavior of the circuit be considered on the basis of the fundamental component alone some quantative errors are involved; qualitatively the analysis is correct, effects due to harmonics being of the second order.

Since, in the preferred form of the device, the leg 7 is of smaller cross section than the leg 5, increase of flux due to primary excitation results in a very rapid increase of saturation of the leg 7 and a correspondingly rapid decrease in its apparent reactance. As this apparent reactance approaches that of condenser 19, the loop circuit as viewed from coil 15 approaches a condition of series resonance. Relatively large currents therefore flow in the loop circuit as a result of very small voltages across coil 15. The sum of the fluxes through legs 5 and 7 remain approximately equal to that in leg 3, but the proportion in leg 5 drops as the series resonant condition of the loop circuit is approached. With increase of input potential a point is eventually reached where the reactive component of the impedance fed by said coil 15 becomes zero and the voltage developed across its terminals is only that necessary to overcome the resistance of the loop and to supply the core losses.

Increasing the input voltage still further results in a complete change of condition, resulting in the "jump" previously mentioned. Overall impedance of the loop circuit, hitherto primarily inductive, now becomes capacitive, and the out-of-phase component of the current supplied by coil 15 reverses in phase accordingly.

Figure 3:
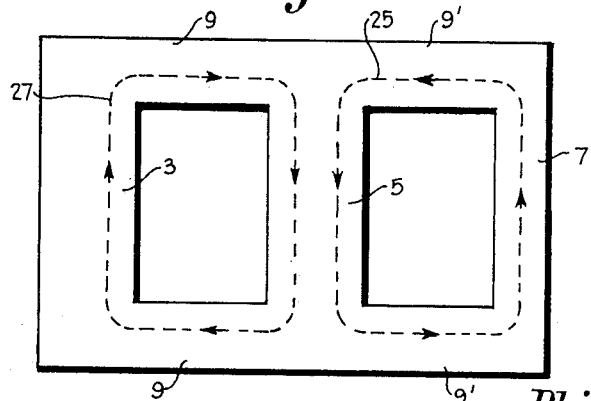
Fig. 3 is a drawing similar to Fig. 2, showing the flux paths when the device is in the extraordinary state.

The reversal of the quadrature phase component in the loop circuit results in a redistribution of the flux in the core, the flux paths suddenly become those illustrated in Fig. 3. Except at the exact point of resonance, the resistive component of the loop circuit impedance is relatively small and the phase of the load current in coil 15 is determined almost entirely by the reactive component. As long as the reactance was inductive the load current provided a counter M. M. F. in leg 5, which effectively bucked out the major portion of the primary flux. With the change of phase of the load current the primary and loop current fluxes become additive and the voltage developed across coil 15 jumps from a very low value to approximately double that which would be produced by the primary flux alone. At the same instant the flux in leg 7 reverses in phase; the flux due to the loop current bucks instead of boosts that from the primary winding. The voltages developed by coils 15 and 17 therefore boost instead of bucking as they did under open circuit conditions.

As a result of the new distribution of fluxes and the voltages resulting therefrom, a very large increase in loop current occurs. The magnitude of this current is now limited primarily by the reactance of the condenser 19 and is equal (very approximately) to the current which this condenser will carry when the voltage across it is equal to the sum of the voltages developed across coils 15 and 17, due account being taken of the fact that these voltages are slightly out of phase, to the harmonic components thereof and to leakage through air paths. Viewed from another aspect, the current in the loop circuit may be considered as that due to a voltage developed by coil 15 into the capacitive reactance of condenser 19 minus the apparent inductive reactance of coil 17. For design purposes the former of these two points of view is probably the more convenient.

The greatly increased current in the loop circuit carries leg 7 to complete saturation, and well beyond. The flux in the path indicated by the dotted line 25, is substantially of saturation value and is substantially an invariant as long as the device is operating in its extraordinary state. This flux may be referred to as the "load flux" or the "load component" of the total flux through leg 5. The flux flowing in the path indicated by the dotted line 27 will vary with the value of the input or primary voltage and may be referred to as the "transformer flux" or "primary flux."

The voltage developed across coil 15 is that due to the resultant of both of these fluxes. The load component is limited by the saturation of leg 7. The transformer flux varies as a direct function of the input voltage, although not, generally, in direct proportion, owing to leakage.

Since the flux threading coil 17 varies only minutely as long as the device is in its extraordinary state the voltage $V_3$ developed cross this coil remains very nearly a constant. Theoretically the voltage should be almost exactly constant if measured by a rectifier type instrument giving average values, although the R. M. S. value should vary slightly. If due precautions be taken, as will be described below, the R. M. S. value may also be made a constant within a small fraction of a percent over a range of voltage of 2 to 1 under full load and over a much greater range under partial or no load.

If the input voltage be reduced after the jump has taken place it will at once be evident that the extraordinary state will persist at inputs materially below the value at which the jump first occurred. The ordinary state will not be resumed until the voltage drop across the condenser becomes equal to the quadrature component of the drop across coil 17 plus that portion of the drop across coil 15 due to the load component of the flux through the latter coil, i. e., until the loop circuit reaches the unstable, series-resonant condition.

While in the extraordinary state, as the transformer component of the voltage decreases the current in the loop circuit also decreases, but not proportionately; the voltage across coil 17 remains a constant, tending to maintain the current flow. Considered from the alternative point of view, as long as saturation obtains in leg 7, the apparent reactance of coil 17 varies inversely as the current. Therefore, as the current decreases, percentage of the reactance which is subtracted from the capacity reactance of the condenser increases and the total impedance of the circuit fed by coil 15 becomes smaller, tending to maintain the current flow.

Adding a load to the circuit, as by closing the switch 23 of Fig. 1, changes the situation to some degree. Viewed from coil 15 the addition of a resistive or inductive load is in parallel with that of coil 17 and, in either case, effectively decreases the reactance in series with the condenser. It would appear that this would decrease the potential at which the jump occurs, and where the load is relatively light and is inductive in character this may actually occur. In the usual case, however, the effect is the opposite. Adding a load decreases the total loop circuit current, besides changing the relative phases of the fluxes; the net result is to raise both jump and break points.

The design of the loop circuit is a matter of ratios rather than actual values and there are, theoretically, an infinite number of designs which would give the same jump and break points. For any given turn ratio as between coils 15 and 17 the size of the condenser required to give any required jump and break points varies inversely as the square of the number of turns, as might be expected from general principles. Doubling the number of turns cuts the size of the condenser required by a factor of four. The most economical design, therefore, depends largely upon the choice of a condenser (or, in the larger sizes, a bank of condensers) which will store the greatest amount of energy at the lowest cost. This means operating whatever size condenser is chosen at its maximum safe working potentials. Since condensers are normally rated in accordance with their safe working voltages, e. g. 300 volts, 600 volts, etc., the starting point of any given design is usually fixed by the condenser itself.

It will be evident that if 300 volt condensers are available in, say 1 microfarad capacities, it would make no theoretical difference whether two such condensers were used in series at 600 volts or in parallel at 300 volts. In practice, however, the smaller amount of insulation and better space factors obtainable by using the lower voltage would indicate that the parallel connection should be adopted.

The condenser voltage having been chosen, coil 5 is designed to provide a maximum potential somewhat lower than the condenser rating. For initial design purposes it may be assumed that from 75% to 80% of the potential developed across the condenser in the extraordinary state will be supplied by coil 15, and the remaining 20% or 25% by coil 17. Some final adjustment of these values may be necessary in the final design but the assumption is adequate as a first approximation.

As will be seen from Fig. 3, the leg 5 carries, in the extraordinary state, both the load flux and the primary flux. Since the magnetomotive forces set up by both coils 15 and 17 in the load flux circuit is in the same direction there is relatively little leakage in this circuit. There may be considerable leakage between legs 3 and 5, especially at maximum input potentials. If legs 3 and 5 are of the same cross section and leg 7 of ½ this cross section and if, as postulated, primary coil 11 is so designed that the induction in leg 3 is something over ½ the saturation value, leg 5 will saturate in the higher range of input voltages. Using the U. S. S. 52 transformer sheet for the core material coil 15 can therefore be computed from the transformer equation by taking, for the value of $B_{max}$ in that equation, the saturation value of 19 kilogausses. From this figure and the known cross section of the leg 5 the turns on coil 15 are readily derived.

The capacity of condenser 19 is dependent on the output load the device is to carry, and the working range to be covered; i. e., the jump and break points under maximum load. Related to these factors is the maximum short-circuit current in the output circuit. All of these quantities are interdependent. The short circuit characteristics may, however, be taken as the point of departure.

On output short-circuit the apparatus always reverts to the ordinary state and when in this state the loads on the output legs, when referred to the primary, appear as though in series; i. e., an impedance in the output of the coil on either leg limits the current in the coil on the other. The required load voltage and amperage are known. The voltage determines the number of turns in the portion of coil 17 across which the output is to be taken, although not the total number of turns in the coil. On short-circuit the voltage across the output portion is reduced substantially to zero, and it follows that the net flux in leg 7 is also reduced substantially to zero. Hence the total primary flux may be considered as linking coil 15.

The voltage across coil 15 then becomes equal to the primary voltage times the turn-ratio between the center and primary coils; it will be materially lower than the extraordinary state voltage, where the center leg approaches saturation.

The maximum short-circuit current may be taken as equal to the designed maximum load current; this, times the load-coil turns, will give the ampere turns in the shorted load coil. Dividing the latter figure by the number of turns in coil 15 will give the value to which the current in the latter coil must be limited to limit the short-circuit current to the desired value. With the coil 15 voltage known, a condenser 19 is selected such that its impedance will so limit the current in it. The equation giving the approximate condenser capacity is, in farads:

$$C = \frac{N_1 N_0 I_s}{2\pi f E_p N_2^2}$$

where $N_1$, $N_2$ and $N_0$ are, respectively, the turns on the primary and center legs and in that portion of coil 17 included in the output circuit, $E_p$ is the primary voltage for which the short-circuit is computed and $I_s$ is that current.

The total number of turns in coil 17 can be computed from the condenser size and the break point at maximum load; i. e., the lowest input voltage at which constant output voltage is to be maintained under maximum current conditions. The break occurs when the volt-amperes in the load circuit and the volt-amperes supplied to coil 17 from the loop circuit approach equality. At minimum input voltage and maximum load the potential across coil 15 falls off, and so, therefore, does the total potential across the condenser. Empirically, for the design parameters here considered, the full-load, break point voltage across the condenser will be about 80% of the maximum, or approximately equal to the voltage developed in coil 15 alone under maximum input, no-load conditions. This voltage, divided by the reactance of condenser 19, gives the current through the latter at the break point. Dividing the maximum volt-amperes by this current gives the volts and hence the required total turns in coil 17.

The fact that the above mentioned procedure leads only to a preliminary design is emphasized, since owing to the facts that all ferromagnetic materials are non-linear in their characteristics and that they differ so widely as between themselves, the only practical way of arriving at a final design is by successive approximations. The characteristic curves provided by the manufacturers of such materials are approximate only, and, as is the case in all equipment where saturation values are involved, there is enough difference between different heats of steel of the same nominal characteristics to make some minor changes in performance of the completed device. This is especially true of the values given for saturation. A preliminary design derived as given above will lead to within a few percent of the required values, and deviations from those values can be corrected by corresponding changes in any of the parameters. An increase in the capacity of the condenser 19 will increase the maximum load which can be drawn from the device and will, at the same time, raise the jump point. An increase in the number of turns of the coil 17 which are included in the loop circuit will raise the jump point and a decrease in this number of turns will, correspondingly, lower it. Decrease in the capacity of the condenser will lower the break-point voltage under no load conditions but will raise the break point under full or overload conditions. Increase in turns on coil 15 will both increase the load carrying capacity and lower the jump voltage, provided the coil 17 turns remain constant.

Decreasing the primary turns will lower the jump and break points, but will also lower the input potential where primary-leg saturation effects begin to occur and thus limit the high voltage end of the characteristic curves.

With the large number of variables involved it will be evident that there are many angles from which the design may be attacked. The method given is by no means the only one possible, or even necessarily, the best for the design of all types. It is offered merely as illustrative of the factors involved.

Implicit in the design data given above is the fact that there is no necessary correspondence between the total turns of coil 17 and the number of turns in the output circuit. The latter may be varied at will to give any output voltage desired, either through auto transformer connections to the coil or by separate windings on the leg 7. These two arrangements are shown schematically, in Figs. 4 and 5, respectively. These two figures, and Figs. 6, 7 and 8 which follow are drawn in simplified schematic form, wherein the wound legs of the core are illustrated by parallel lines, three lines being used to indicate the larger legs 3 and 5 and two lines to indicate the smaller leg 7. The magnetic coupling between the various legs is indicated by the brackets at the tops of the figures. This mode of illustration is used to clarify and focus attention upon the electrical elements of the circuits involved, the magnetic circuits being substantially the same in each case.

Figure 4:
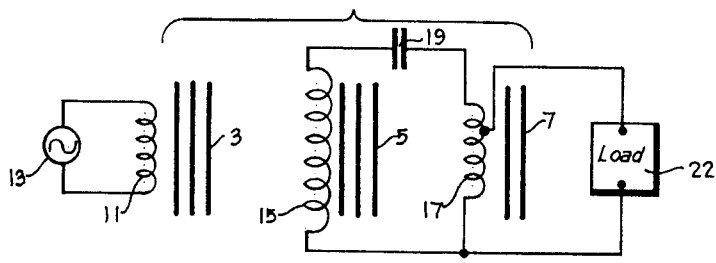
Figs. 4 through 8 are schematic diagrams showing various modifications of the electrical circuits, the magnetic circuits being schematically illustrated by parallel lines representing the core, the brackets above the diagram symbolizing the fact that the cores are magnetically linked to form complete magnetic circuits of the type shown in Fig. 2 or 3.

In the circuit shown in Fig. 4 it is assumed that the desired output voltage is lower than that which would be developed in coil 17 using the values of condenser voltage and capacity derived as given above. If the desired output voltage were higher than the voltage across coil 17 as thus computed, additional turns may be wound on coil 17, the lead from the condenser 19 being connected at a tap.

Figure 5:
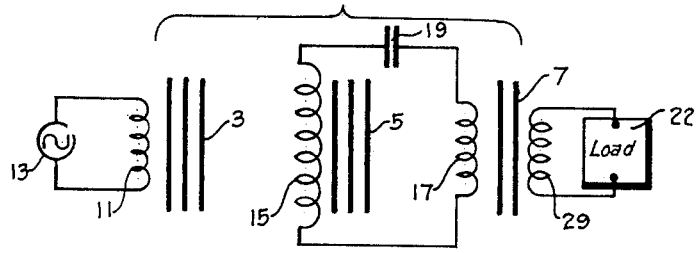

In the showing of Fig. 5 the load is taken off of a separate winding 29. The winding on leg 7 can be treated as if this leg comprised a separate output transformer, an auto-transformer connection being used in the showing of Fig. 4 and a separate winding transformer in the showing of Fig. 5. As is well known, the two are, for most purposes, exact equivalents, the common portion of the coil doing double duty where the auto-transformer connection is used.

Figure 11:
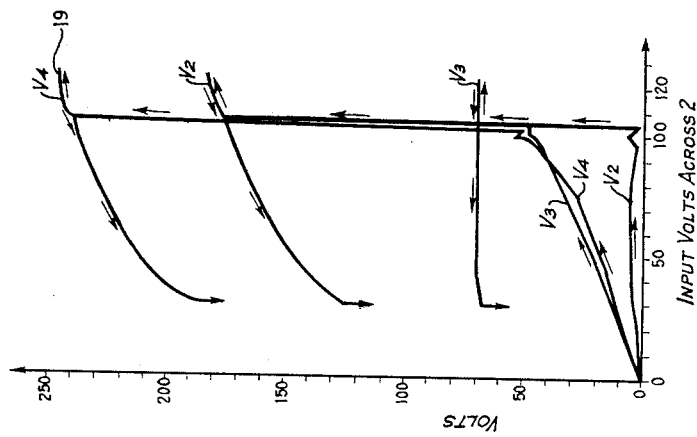
Fig. 11 is a group of curves showing the voltages developed across various portions of the circuit in an early embodiment of the invention.

Fig. 11 is a series of graphs illustrating the variation of the voltages across the different portions of the circuit in a unit made in accordance with the principles above set forth. These particular graphs illustrate the no load performance of a unit described in prior application Serial No. 72,713, above identified, of which this application is a continuation-in-part. In this particular unit the ratio of the open circuit voltages developed across coils 15 and 17 was of the order of 3 to 1; the actual ratio of these voltages, in any such unit, depends upon the input voltage at which they are measured, owing to the change in reluctance of the two paths with changing flux therein. The disparity tends to become greater with increasing input voltages, particularly when the leg 7 is of smaller cross section than leg 5, and therefore if the potential developed across coil 15 exceeds that across coil 17 at input voltages approaching zero this general relationship will continue to exist irrespective of the actual value of input potential.

The curves of Fig. 12 are representatives of readings taken from a more recent device. In this particular set of graphs no-load and full-load values are plotted together to make the relationships more evident. All the curves are plotted against the input voltage as indicated by the meter $V_1$. Curve 41 represents the potential across coil 17 under no-load conditions. Curve 43 illustrates the voltages across the condenser 19 as measured by the meter $V_4$, and curve 45 the voltage developed across coil 15 as measured by meter $V_2$. Curves 41' 43' and 45' represent voltages developed across the same elements as indicated by the curves designated by like numbers, unaccented, the curves designated by the primed reference characters being representative of full-load conditions. Curves 41 and 41' are substantially coincidental in the portions above the full load break point. The values indicated for curves 43 and 43' are not equal to the arithmatic sums of curves 41' and 45' respectively, for two reasons; first, and most important under full-load conditions, there is a phase angle between the voltages across the two coils, owing to the resistive load. Second, and important under no-load conditions, there is a large harmonic component in the circulating current. Individual frequency components of the circulating currents are very nearly 180° out of phase so that, considered separately, the sums of the voltages across the coils is very nearly equal to the corresponding voltage across the condenser. The readings, however, were taken with an electrodynamometer type meter, giving effective values, and where the voltages across the various elements appear in different ratios, the root-mean-square value of the voltage across the condenser will, in general, be less than the sum of the R. M. S. values across the coils. In the lower branches of the curves, below the jump point, only full-load values are given, the no-load curves being so nearly the same as to confuse the figures were they shown.

Fig. 13 indicates the variation of primary current with primary voltage, the readings being taken on the same unit and under the same conditions as the curves of Fig. 12. Curve 47 is the no-load current-voltage curve as measured by meter $A_1$ and curve 47' the corresponding full load curve. These curves illustrate clearly the negative impedance characteristics of the device and it will be seen that by varying the load imposed on coil 17 the effective value of the negative impedance may be varied at will between the two ranges indicated. The lower branch of the curve, designated as 47", indicates the variation of current with voltage under ordinary-state conditions. This latter branch of the curve was taken with the device loaded, since under no load the input current was too small to be measured on the meters available.

Fig. 14 illustrates the effects of varying the resistance in the output circuit while maintaining constant input voltage. Curve 48 represents the load current in a small regulator designed to supply 21 volt-amperes at 21 volts. The arrow indicates the designed full-load point. To the right of this point, and to the left, as far as approximately 50% overload, the output curve has its normal hyperbolic form. To the left of the 150% load rating the curve drops off to a very slightly over its normal full load value and remains at this point down to conditions of complete short circuit. Curve 49 is drawn to a different scale and indicates the primary current. As the resistance in the load circuit is decreased, below the break point, the current drops off to a value too small to be measured upon an instrument on which normal values can be read. The device is therefore self-protecting under short circuit conditions.

Since it is saturation that limits the flux, and consequently the voltage, in the output leg and the coil which is wound upon it it would appear, from purely theoretical considerations, that it would be the average voltage throughout the cycle, rather than the R. M. S. voltage, that would remain constant, and that this voltage should be independent of the load. Since the harmonic content increases as the load is decreased the R. M. S. value of the voltage might be expected to change with load. Where the device is intended to supply a resistive load of constant value, and wave forms are not important, these considerations are not material, but where wave form is important and the requirement is for a constant effective (as distinguished from average) voltage, these matters become very important indeed. An admittedly puzzling characteristic of the device is the fact that both the average voltage, as measured on a rectifier type meter, and the R. M. S. voltage, tend to rise very slightly with increasing load. There is also a tendency for the voltage across coil 17 to rise very slightly as the input potential is decreased to nearly the break point; this effect is more noticeable on no-load than on full-load.

Figure 6:
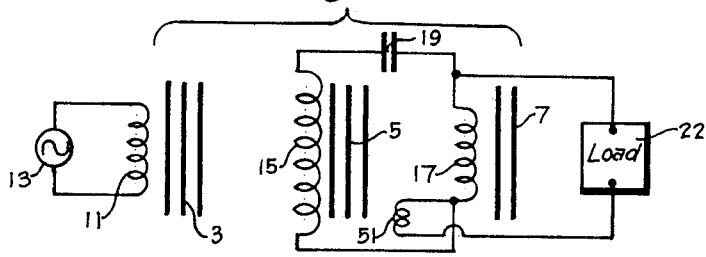
Figure 7:
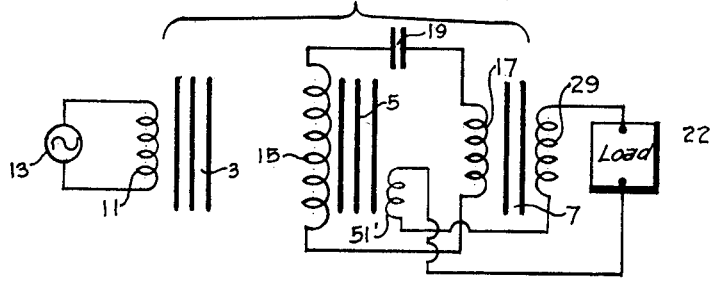
Figure 8:
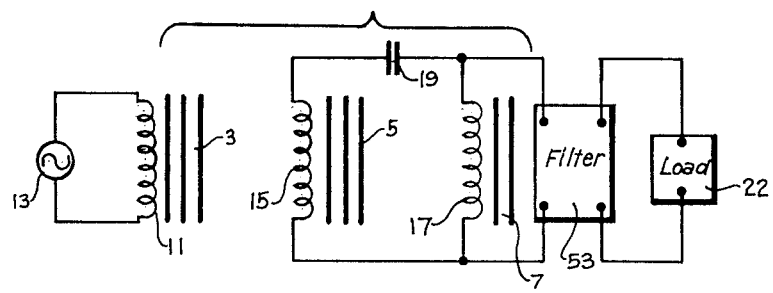

In general all of these effects are more noticeable on units of relatively large size than they are on smaller ones. Several methods are available for applying the second order corrections for these effects where such corrections are important. The voltage across coil 15 drops with load and with decreasing input voltage. The higher the saturation in leg 3 the smaller this drop becomes, although, since higher saturation means greater leakages between legs 3 and 5, the difference is small. By adding a very small compensating coil 51, wound on leg 5, as shown in Fig. 6 the rise in voltage in coil 17 (or an output coil wound on the same leg) can be almost exactly compensated by the corresponding drop in coil 15 or the coil 51 which carries the same flux, since it is quite obvious that a tap on coil 15 can exercise the same function as the separate coil. Fig. 7 illustrates a variant of this connection which may be employed when it is desired to separate the loop and load circuits entirely, coil 51' being connected to boost the voltage produced in the load coil 29.

The addition of a portion of the voltage derived from the flux in leg 5 also produces an improvement in wave form, some of the harmonics generated by the flux in coil 15 being out of phase with those in coil 17.

These latter effects and the number of turns to be added to produce them being dependent in part upon the leakage flux, are also dependent upon the relative lengths of the legs in comparison with the yokes 9 and 9'. In certain configurations as much as 50% of the output voltage has been taken across the coil on leg 5, but in general best results have been obtained with a much smaller proportion of the voltage derived from the middle leg.

Another method of reducing the harmonic content, while maintaining constant voltage characteristics, is obtained by adding a filter across the output circuit, in accordance with well known practice in voltage regulators whose action depends upon core saturation. Such an arrangement is indicated diagrammatically in Fig. 8, the filter 53 being indicated simply in block form as it is in accordance with known practice. It may take the form of series or shunt elements or of combinations thereof.

Certain other characteristics of the device may be mentioned. The power factor of the device of itself is leading, when operated in the extraordinary state, and when operated under full load conditions into resistive load is usually in the neighborhood of 85%; feeding into a reactive load, such as an induction motor or other device having a lagging power factor, the efficiency will, of course, be higher. In a design where iron and copper losses are reasonably well balanced efficiencies of between 80% and 90% can be achieved within reasonable limits of manufacturing cost.

Output voltage varies in very nearly direct proportion to supply frequency. This is in contra-distinction to regulators of the type wherein regulation depends upon the tuning of some circuit within the device to the peak of a resonance curve, in which case much greater deviations with frequency are to be expected.

Since the device has two stable states wherein the conditions are enormously different there are certain uses that present themselves. One such use is as a contactless overload relay. If the primary winding is made of a single turn of heavy conductor and connected in series with a supply line, as shown in Fig. 15, an overload control system of great accuracy and positiveness of action can be attained. In Fig. 15 the source 13' feeds the low impedance primary 11' in series with a power line 61. Since all of the other portions of the unit may be identical with those already shown they are indicated by the same reference characters. The output, however, is taken across the coil 15 instead of coil 17 or a portion thereof, and feeds a trip coil 63 of a circuit breaker (not shown). The size of the condenser 19 and the coil 17 can be adjusted to cause the jump to take place at any desired input current, and, since, in the ordinary state there is a substantially linear relation between current and voltage, a jump will take place when the input current reaches a definite limiting value. The magnitude of this jump is indicated by a curve 45 of Fig. 12, the output voltage increasing 15 fold at this point. Furthermore, the jump point can be accurately regulated by adjusting a rheostat 65 across coil 17. The problem of accurately adjusting marginal relays, with the uncertainty of operation which such adjustment necessarily involves, is easily and completely avoided. Obviously the primary may be shunted if the currents involved are such that a single turn primary would give too high magnetization.

Fig. 16 is illustrative of a modification of the invention which is especially useful where it is to be employed for its negative impedance characteristics or because of its differing outputs in its two stable states, as a switching device. Parts of this figure corresponding to like parts in preceding diagrams are identified by like reference characters followed by the postscript "C," and will not be again described.

In this modification the core is so constructed as to introduce an air-gap in the portion of the magnetic circuit including the leg 7c. As shown, this is accomplished by making the yoke 9c' movable, so that the length of the air-gap can be varied. Increase in the length of the gap decreases the apparent impedance at any given input voltage.

When used in this manner a load may be inserted in the circuit in series with the source 13c and the primary winding 11c. Such load may either be inserted directly or may be connected to terminals 65 of a transformer 67, and by proper choice of the relative impedances a constant current output may be approached.

The same connections may be employed when using the device as a contactless switch. This function depends on the very large difference in input impedance of the device in its ordinary and extraordinary states. If the transformer 67 with its load be so proportioned that the voltage drop across it due to the ordinary-state current in the device is low enough to permit the voltage across primary 11c to rise above the jump point, while the extraordinary state voltage drops below the break point, due to the increased drop under load, the device will oscillate between the two states at a rate dependent on the nature and magnitude of the load and the constants of the device itself. These latter constants can be varied by altering the air gap, if an adjustable rate of switching is desired; if not, a device of the type shown in Fig. 1 may be used. What occurs may be appreciated by reference to Figs. 12 and 13. Under load the jump point is about 100 volts and the break point is about 85 volts. The primary current just below the jump is 0.10 ampere, and just above the break is 0.43 ampere.

Assuming a supply voltage of 115 volts, and an effective load resistance of, say, 80 ohms, a current of 0.10 ampere would drop the voltage only 8 volts, giving a voltage across the primary 11c of 107, which is above the jump point. After the jump takes place the current increases toward its break-point value of 0.43 ampere, which corresponds to a drop of 34 volts, reducing the potential across the primary coil 11 to 81 volts, which is below the break-point, causing the system to revert to the jump condition.

Still more effective performance can be attained by connecting the load across terminals 69. In this case the voltage across the load jumps from a value of about 10 v. to a value of about 300, or in this same ratio between any actual values that may be selected. The primary of transformer 67 then may be taken to represent an inductive series impedance, and very little power will be wasted therein. The volt-ampere load that can be carried across terminals 69 is approximately the same as can be carried across coil 15.

Adding a condenser 71 (shown in dotted lines since it is an optional part of the system and not included in the device per se), increases the duration of the transients which occur at the change of state and in general will slow the rate at which such changes take place. It is to be noted, however, that tuning a series element in the system to or near a harmonic of the supply frequency may result in unpredictable results.

Other uses for the basic unit are disclosed in copending applications of this inventor Serial Nos. 57,760, now Patent No. 2,603,771, and 77,550, now Patent No. 2,611,890, entitled, respectively "Magnetic Trigger System" and "Multivibrator and Impulse Generator."

Inventor is aware that the jump phenomenon, of itself, is not new. Equipment utilizing this property of magnetically saturable reactors, when it connected in circuits which would be resonant were linear reactors used therein, have been disclosed, for example, by Suits and others. In order to utilize these circuits, as they have heretofore been disclosed, it has been necessary to provide series resistors wherein a large proportion of the energy in the circuit is wasted, or alternatively, where the saturable elements are connected in circuits of the series resonant type, parallel resistances have been used, offering the same disadvantages. The distinguishing characteristic of the present device are that the magnetic circuit is such that the flux threading coil 17 can reverse without reversal of flux in the input leg and that the open circuit voltage is higher in the center leg than the other end leg. Upon so proportioning the coils upon legs 5 and 7 the flux reversal does take place. If the end coil 17 is so designed that its potential on open circuit exceeds that of coil 15 the effect at low input voltages is to decrease the potential across coil 17 and increase that across coil 15. This effect continues only so long as the increase in magnetomotive force in the magnetic circuit comprising leg 7 in the yokes 9' is sufficient to balance the excess reluctance in this circuit over the reluctance of leg 5, which is a comparatively small quantity. The only return path of the flux is through leg 3; there is no opportunity for a reversal through either legs 5 or 7 and the jump, and its accompanying phenomena, do not take place.

Figures 9, 10:
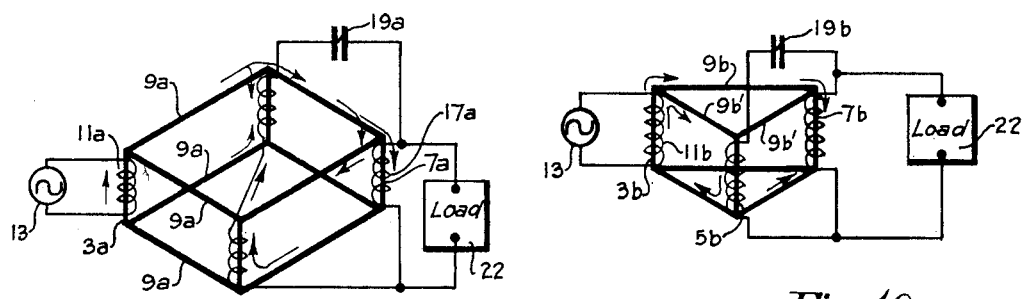
Figs. 9 and 10 are highly conventionalized schematic diagrams showing alternative forms of core structure, the various legs and yokes of the cores being indicated in these last two diagrams by single heavy lines.

Theoretically numerous magnetic circuits exist which would exhibit the same characteristics as the simple three legged core which has thus far been discussed. Two such arrangements are shown in highly schematic fashion in Figs. 9 and 10, wherein the various core numbers are shown by heavy lines in a perspective type diagram. In Fig. 9 the core elements are arranged along the corners of a rectangular prism, the yoke members 9a and 9a' being disclosed along the edges of the prism defining its upper and lower faces while the wound legs 3a, 5a and 7a occupy the vertical corners of the prism. The input coil 11a and the output coil 17a are wound on corners diagonally opposite. Center coil 15a is divided into two parts, one half of which is wound on each of the other two diagonally opposite corner legs. Coil 15a is split into two parts which are shown connected in series, but by rearrangement of turn ratios and winding cross sections they could equally as well be connected in parallel. It will be seen that in effect such an arrangement is merely the equivalent of splitting the paths between legs 3 and 7 into two parts and that the magnetic circuit is the full equivalent of that shown in Figs. 1, 2 and 3.

Another configuration which could be used is that illustrated in Fig. 10. In this last figure the magnetic legs of the core comprise the corners of a triangular prism. The primary flux divides substantially equally between legs 5b and 7b an open circuit or on low input voltage. When current flows in the loop circuit yokes 9b" carry increasing proportional fluxes, although the flux in all of the yokes increases. Before the jump takes place, the sum of the fluxes through legs 5b and 7b is equal to the flux through leg 3b, neglecting leakage. After the jump takes place the flux through leg 5b is equal to the sum of the fluxes through legs 3b and 7b. Once this effect has taken place the yokes 5b could be removed with only second order effects upon the voltages and fluxes in the system, and again the effective circuit would be substantially the same as that as in the original three-leg transformer. Construction of such cores as are schematically illustrated in Figs. 9 and 10 would be extremely difficult and expensive and would have no real advantage. They are therefore shown only for the purpose of illustrating the point that there are many core structures theoretically possible which meet the requirements of the invention. Others, which may be mentioned, would comprise a 5 leg structure. This would be the equivalent of two 3-leg cores placed end to end. Such a structure could have a single primary winding on the center leg and two output windings on the end legs, or two primary windings on the outer legs and a single output winding on the center leg. Such an arrangement is not believed to have any practical significance and it is mentioned merely to indicate that the possibilities of designing magnetic circuits which meet the requirements are almost innumerable.

From the above it should be apparent that neither the forms in which the device has been illustrated nor in the quantities in proportions which have been chosen for such illustration are intended to be limiting except insofar as such limitations are embodied in the following claims.

I claim:

1. An alternating current regulating device comprising a ferromagnetic core forming a substantially complete magnetic circuit and a magnetic flux path bridging said magnetic circuit between the end portions thereof, a primary winding on one of said end portions, additional windings on the other end portion and said magnetic flux path, a condenser, and connections forming a loop circuit comprising said condenser and said other windings in series, the product of the cross-sectional area of said magnetic flux path times the number of turns of the winding thereon being greater than the product of the cross-sectional area of said other end portion times the number of turns of the winding thereon and said lastmentioned windings being so connected that their open-circuit voltages are in series bucking relation.

2. An alternating current regulating device comprising a ferromagnetic core having at least a first, a second and a third leg interconnected to form a magnetic circuit including said first and third legs bridged by said second leg at a location between said first and third legs, a primary winding on said first leg, second and third windings on said second and third legs respectively, the product of the cross-sectional area of said second leg times the number of turns of said second winding being greater than the product of the cross-sectional area of said third legs times the number of turns of said third winding, means connecting said second and third windings to form a loop circuit wherein said second and third windings are in bucking relation with respect to their respective open circuit voltages, and a capacitive element connected in series in said loop circuit.

3. An alternating current regulating device comprising a ferromagnetic core having at least a first, a second and a third leg interconnected to form a magnetic circuit including said first and third legs bridged by said second leg at a location between said first and third legs, a primary winding on said first leg, second and third windings on said second and third legs respectively, the product of the cross-sectional area of said second leg times the number of turns of said second winding being greater than the product of the cross-sectional area of said third leg times the number of turns of said third winding means connecting said second and third windings to form a loop circuit wherein said second and third windings are in bucking relation with respect to their respective open circuit voltages, and a capacitive element connected in series in said loop circuit, the cross sectional area of said third leg being smaller than that of either of said first and second legs.

4. An alternating current regulating device comprising a ferromagnetic core having two end legs and a center leg, a primary coil on one of said end legs, second and third coils on said center and end legs respectively, a condenser, and connections forming a loop circuit comprising, in series, said condenser and said second and third coils in bucking relationship with respect to the open circuit voltages induced therein by currents in said primary coil, the product of the number of turns of said second coil times the cross-sectional area of said center leg being greater than the product of the number of turns of said third coil times the cross-sectional area of the end leg whereon it is disposed.

5. An alternating current regulating device comprising a ferromagnetic core forming a substantially complete magnetic circuit and a magnetic flux path bridging said magnetic circuit between the end portions thereof, a primary winding on one of said end portions, additional windings on the other end portion and said magnetic flux path, a condenser, connections forming a loop circuit comprising said condenser and said other windings in series, the product of the cross-sectional area of said magnetic flux path times the number of turns of the winding thereon being greater than the product of the cross-sectional area of said other end portion times the number of turns of the winding thereon and said last-mentioned windings being so connected that their open circuit voltages are in series bucking relation and a load circuit including a winding linked with said other end portion.

6. A regulating device as defined in claim 5 wherein said load circuit winding comprises at least a part of the winding on said end portion included in said loop circuit.

7. An alternating current regulating device comprising a ferromagnetic core forming a substantially complete magnetic circuit and a magnetic flux path bridging said magnetic circuit between the end portions thereof, a primary winding on one of said end portions, additional windings on the other end portion and said magnetic flux path, a condenser, connections forming a loop circuit comprising said condenser and said other windings in series, the product of the cross-sectional area of said magnetic flux path times the number of turns of the winding thereon being greater than the product of the cross-sectional area of said other end portion times the number of turns of the winding thereon and said last-mentioned windings being so connected that their open-circuit voltages are in series bucking relation, and a load circuit including windings having a major portion thereof linked with said other end portion and a minor portion thereof linked with said magnetic flux path.

8. A regulating device as defined in claim 7 wherein said load circuit windings comprise at least a part of the windings included in said loop circuit.

9. An electrical circuit having a negative impedance characteristic over a relatively wide range of applied voltages comprising a primary winding, a ferromagnetic core having a branch extending through said winding and a plurality of other branches providing substantially closed paths of different lengths to flux generated by said winding, a first secondary coil on a branch included in the shorter of said paths, a second secondary winding on a branch included in the longer of said paths, the number of turns in said first secondary winding being at least as great as the number of turns in said second secondary winding, and a condenser connected in series with both of said secondary windings to form a loop circuit wherein the open circuit voltages induced in said secondary windings are in bucking relation.

10. An electrical circuit in accordance with claim 9 including means for varying the reluctance of the longer of said paths.

11. A circuit in accordance with claim 9 wherein at least a portion of said core in said longer path is of smaller cross section than that of the branch within said secondary coil.

12. An alternating current regulating device comprising a ferromagnetic core forming a substantially complete magnetic circuit and a magnetic flux path bridging said magnetic circuit between the end portions thereof, a primary winding on one of said end portions, additional windings on the other end portion and said magnetic flux path, a condenser, and connections forming a loop circuit comprising said condenser and said other windings in series, the product ANB of the windings on said flux path being greater than the product ANB of the windings on said other end portion, where A is in each case the cross-sectional area of the portion of said core within the specified winding, N is the number of turns comprised in the specified winding and B is the flux density in the core area A within the specified winding, said other windings being so connected that the voltages developed therein on open circuit are in series bucking relationship in said loop.

References Cited in the file of this patent

UNITED STATES PATENTS

| | | |
|---|---|---|
| 2,221,456 | Pohm et al. | Nov. 12, 1940 |
| 2,312,768 | Mitchel | Mar. 2, 1943 |
| 2,340,791 | Burdick | Feb. 1, 1944 |
| 2,434,493 | Gburski | Jan. 13, 1948 |
| 2,436,925 | Haug et al. | Mar. 2, 1948 |
| 2,444,715 | Walker | July 6, 1948 |
| 2,608,681 | Stevens | Aug. 26, 1952 |